March 10, 1959 M. E. WILSON 2,877,150
METHOD OF MANUFACTURING PIPES, CONDUITS, AND THE LIKE
Filed May 11, 1955
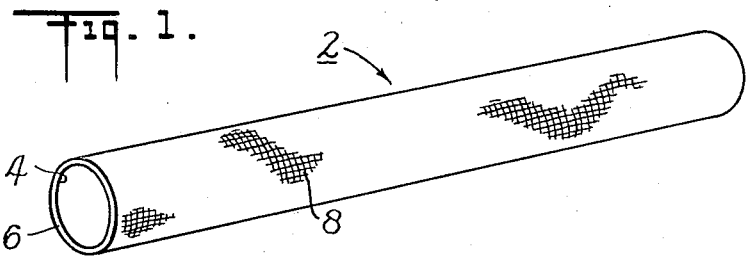
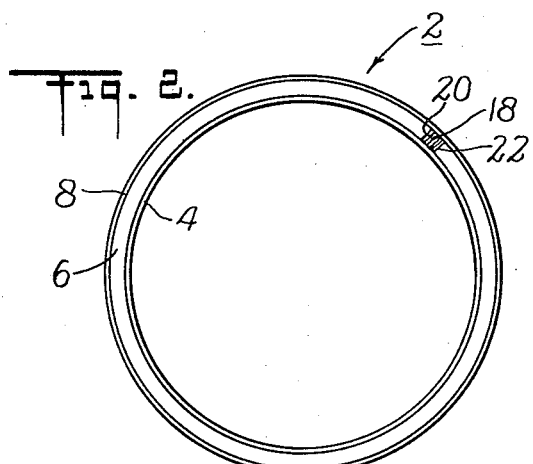
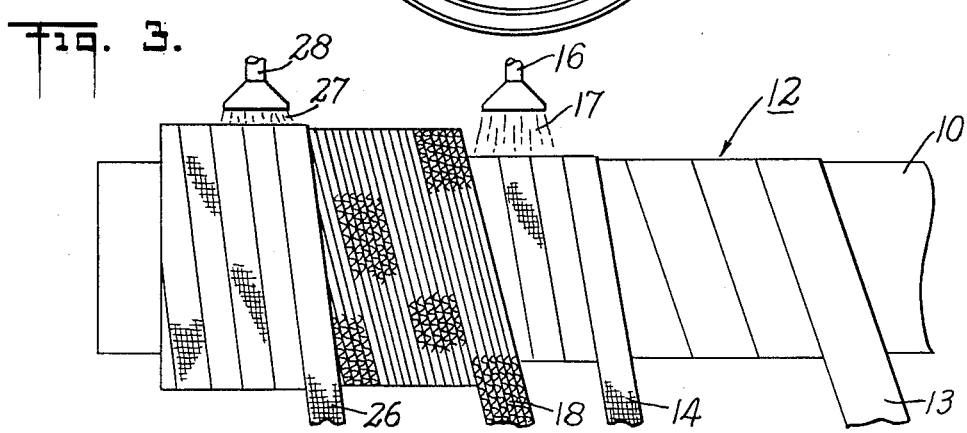
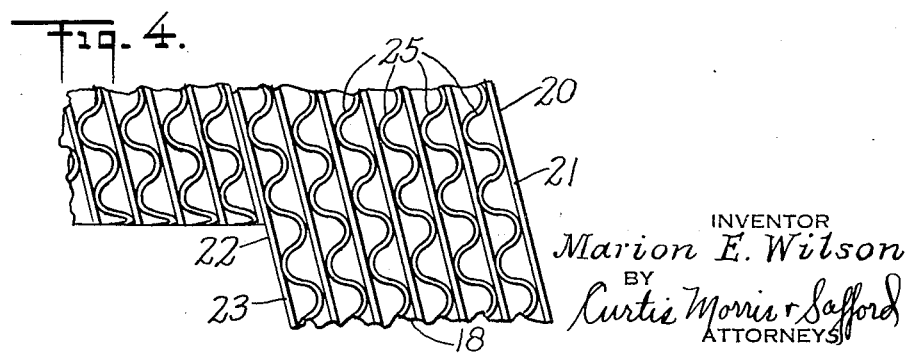
INVENTOR
Marion E. Wilson
BY
Curtis, Morris & Safford
ATTORNEYS United States Patent Office 2,877,150
Patented Mar. 10, 1959

2,877,150

METHOD OF MANUFACTURING PIPES, CONDUITS, AND THE LIKE

Marion E. Wilson, Denver, Colo.

Application May 11, 1955, Serial No. 507,623

3 Claims. (Cl. 154—83)

This invention relates to large diameter tubes, pipes or conduits, and more in particular to such structures for use as sewers, culverts, irrigation lines and other liquid and fluid flow applications.

An object of this invention is to provide an improved structure of the above character. A further object is to provide light-weight tubes, pipes and conduits which are superior to those previously available. A further object is to provide thin-walled tubing and piping which may be of large diameter and yet which has sufficient strength to withstand high internal pressures and external forces during use and which is not damaged by the abuse of handling, installation and use. A further object is to provide structures of the above character which are economical to manufacture, and to ship and install, and which have smooth inside surfaces for good hydraulic flow characteristics. A still further object is to provide for the above with structures which are adaptable to many conditions of handling and use. A still further object is to provide for the above with structure which may be varied during manufacture to provide the desired strength and other characteristics, and which may be fabricated in a simple and inexpensive manner. A still further object is to provide an improved method of manufacturing structures such as those referred to above. These and other objects will be in part obvious and in part pointed out below.

In the drawings:

Figure 1 is a perspective view of a conduit constituting one embodiment of the invention;

Figure 2 is a sectional view of the conduit of Figure 1;

Figure 3 is a schematic representation of the process for manufacturing the conduit in Figure 1; and, Figure 4 is an enlarged showing of the central portion of Figure 3.

Referring to Figures 1 and 2 of the drawing, a conduit 2 has an inner layer 4 of glass fiber impregnated with a resin, an intermediate layer 6 of substantial thickness and formed of strips of multi-layer corrugated paper board, and an outside layer 8 of glass fiber impregnated with resin. In this particular embodiment of the invention, the intermediate layer 6 is formed by cutting a large sheet of multi-layer corrugated paper into thin strips, and then winding these thin strips in a spiral so that the longitudinal corrugations in the paper extend radially, that is, the corrugations extend transversely of the inner and outer layers 4 and 8.

Referring now to Figure 3, the conduit of Figures 1 and 2 is formed upon a mandrel 10 which is rotatably mounted (by means not shown). In forming this conduit, mandrel 10 is covered with a layer 12 of parting material, formed in this case by spirally winding a strip 13 of paper which has been coated to render it waterproof and repellent to various liquids and fluids. Over this layer 12 is wound a fiber strip 14 of glass fiber, and this strip is sprayed from a nozzle 16 with a plastic resin 17 to be described more fully below. This resin 17 thoroughly impregnates strip 14 and forms the inner layer 4 of the conduit.

Immediately after the forming of layer 4, a strip 18 of the multi-layer corrugated paper is wound spirally onto layer 4 as shown in Figure 4, with the sheets of paper and the longitudinal corrugations being positioned radially with respect to the mandrel. That is, the two edges 20 and 22 of the strip 18 are formed by the top and bottom paper layers 21 and 23 of the original sheet of multi-layer corrugated paper, and in between these two edges there are illustratively six corrugated separators 25 positioned between and bonded to the paper layers parallel to the layers 21 and 23 at the edges. The outer layer 8 of the conduit is formed by a fabric strip 26 of glass fiber wound spirally similar to the winding of strip 14 to form the inner layer 4. The strip 26 is similarly impregnated by resin 27 applied through a spray nozzle at 28.

The resin 17 and 27 is applied in sufficient quantity to provide an excess so that the layer 6 is solidly bonded to the inner and outer layers 4 and 8. Hence, the layer 6 is confined between the two annular walls which act as reinforcing shells, and they also provide firm support for the individual corrugations and sheet portions or strips. The resin is cured or otherwise caused to solidify, so that the conduit is adapted to withstand very substantial radial forces and impacts, and substantial internal pressures. Under some circumstances, the layer 6 is also thoroughly impregnated with resin so that each sheet portion of the corrugated paper has its strength materially increased.

In this embodiment of the invention, the resin is a polyester with an accelerator for high-speed curing. The invention contemplates the use of silicone plastics having the properties of thorough absorption or impregnation, maximum strength and resistance to heat and fire. It has also been indicated that the resin or plastic on the internal surface should have inherent smooth flow characteristics.

In the illustrative embodiment, the conduit or pipe has an inside diameter of 24 inches and the intermediate layer 6 is of 5/8 inch thickness. That is, this layer is formed by first cutting a strip of the multi-layer corrugated paper into strips of 5/8 inch width, and then winding this strip as described above. The strip is positioned with the original 5/8 inch width of the strip as the radial thickness of the intermediate layer. Illustratively, the inside and outside layers 4 and 8 are 1/32 inch thickness. Hence, the outside diameter of the pipe or conduit 2 is of the order of 25 and 3/8 inches.

The invention contemplates that the inner and outer layers 4 and 8 may be of nylon, Orlon, Dacron, or other suitable plastic reinforcement which is impregnated with a polyester silicon, or other low pressure plastic. Also, the intermediate layer may be paper board impregnated with waterproof plastic, aluminum, foam concrete, foam plastic, or other low cost and light weight filler having substantial strength.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In the art of manufacturing tubes, pipes and the like, the steps of, rotating a mandrel with a parting material thereon, winding a strip of glass fiber fabric spirally onto the mandrel to provide a cylindrical inner layer, simultaneously impregnating said fabric with an adhesive material which has the characteristic of setting, winding a strip of corrugated paper onto said layer with the corrugations extending substantially radially with respect to the axis of the mandrel to form an intermediate layer surrounding said inner layer, winding a strip of glass fiber fabric onto said intermediate layer to form an outer layer enclosing said intermediate layer, and substantially simultaneously impregnating said outer layer with an adhesive material which has the characteristic of setting.

2. A method as described in claim 1 wherein the adhesive material is an uncured resin which may be set and hardened, and which includes curing the resin.

3. A method as described in claim 1 which includes the preliminary step of, forming said strip of corrugated paper by cutting a sheet of multi-layer corrugated paper board into strips of a width substantially equal to the radial dimension of said intermediate layer.

References Cited in the file of this patent

UNITED STATES PATENTS

| | | |
|---|---|---|
| 1,765,226 | Fountain | June 17, 1930 |
| 2,226,523 | Peck | Dec. 24, 1940 |
| 2,401,974 | Siebels | June 11, 1946 |
| 2,653,887 | Slayter | Sept. 29, 1953 |